United States Patent
Jobi

(10) Patent No.: US 10,481,478 B2
(45) Date of Patent: Nov. 19, 2019

(54) DUST-PROOF CASE, LIGHT SOURCE UNIT AND PROJECTOR

(71) Applicant: CASIO COMPUTER CO., LTD, Tokyo (JP)

(72) Inventor: Osamu Jobi, Hachioji (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 16/058,471

(22) Filed: Aug. 8, 2018

(65) Prior Publication Data
US 2019/0094676 A1    Mar. 28, 2019

(30) Foreign Application Priority Data
Sep. 26, 2017 (JP) ................. 2017-184871

(51) Int. Cl.
*G03B 21/20* (2006.01)
*G03B 21/14* (2006.01)

(52) U.S. Cl.
CPC ....... *G03B 21/2093* (2013.01); *G03B 21/145* (2013.01); *G03B 21/204* (2013.01)

(58) Field of Classification Search
CPC ...... G03B 21/14; G03B 21/28; G03B 21/145; G03B 21/208; G03B 21/2093; H04N 9/31; H04N 9/315; H04N 9/3141; F21V 31/005; F21V 31/30
See application file for complete search history.

(56) References Cited

U.S. PATENT DOCUMENTS

2011/0216291 A1 * 9/2011 Matsushita .......... H04N 9/3144
                                                        353/119
2015/0185594 A1 * 7/2015 Chen ................... G03B 21/145
                                                        353/52

FOREIGN PATENT DOCUMENTS

JP        2015-222306 A    12/2015

* cited by examiner

*Primary Examiner* — Sultan Chowdhury
(74) *Attorney, Agent, or Firm* — Fitch, Even, Tabin & Flannery LLP

(57) ABSTRACT

A dust-proof case includes a case main body having a lid member resting surface that is formed on an outer circumferential portion and a wall portion that is formed on an outer circumferential side of the lid member resting surface, and a lid member having a lid member main body having a plurality of corner portions and an elastic portion that is in abutment with an inner surface of the wall portion that is formed on an outer circumference of the lid member main body and rested on the lid member resting surface, and the elastic portion includes the plurality of corner portions and a straight-line portion in a circumferential shape thereof, and a circumferential cross-sectional area of the elastic portion is narrower at the corner portion than at the straight-line portion.

20 Claims, 8 Drawing Sheets

DUST-PROOF CASE, LIGHT SOURCE UNIT AND PROJECTOR

CROSS-REFERENCE TO RELATED APPLICATION

Figure 1:
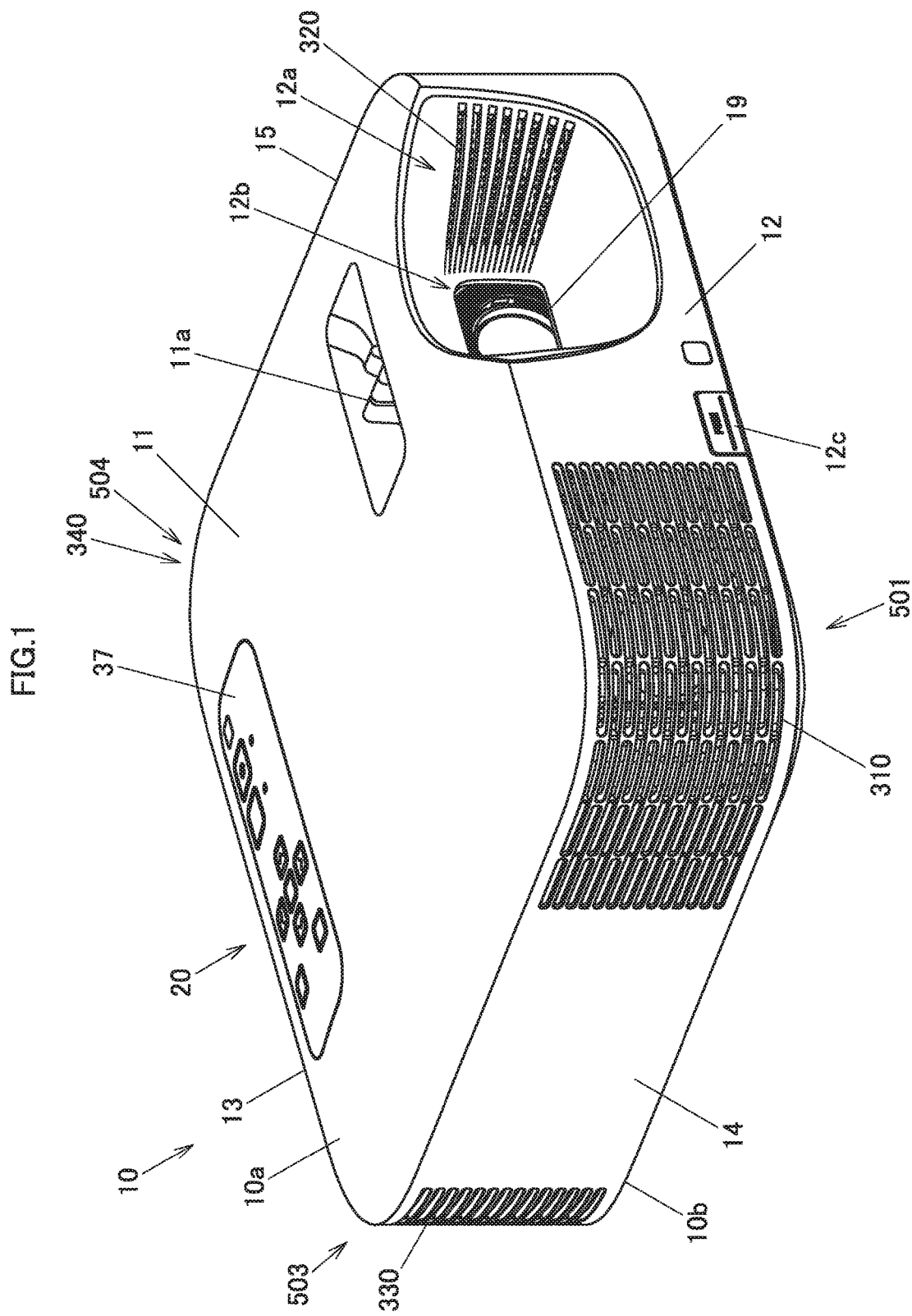

This application is based upon and claims the benefit of priority under 35 USC 119 from the prior Japanese Patent Application No. 2017-184871 filed on Sep. 26, 2017, the entire disclosure of which, including the description, claims, drawings and abstract, is incorporated herein by reference.

BACKGROUND OF THE INVENTION

Field of the Invention

The present invention relates to a dust-proof case, a light source unit including this dust-proof case, and a projector including this light source unit.

Description of the Related Art

In an apparatus including precision devices such as electronic devices and optical members, a configuration is adopted from time to time in which these precision devices are accommodated in a case, and the case and other units such as a power supply unit and cooling fans are stored in an interior of a casing that is an external member. For example, Japanese Unexamined Patent Publication No. 2015-222306 (Patent Document 1) discloses a projector in which a light source unit case and a projection unit case are stored together with various types of circuit boards and cooling fans in an interior of a casing that is made up of an upper case and a lower case.

The light source unit case of the projector accommodates therein a blue light source device and a red light source device that each include a solid-state light emitting device, a green light source device that includes a luminescent wheel device, a light guiding optical system that includes optical members such as a collective lens and a light tunnel that guide lights emitted from the blue, red and green light source devices and the like.

In recent years, projectors including precision devices are used in an environment where a dust-proof property is required. In the projector disclosed by Patent Document 1, a measure to enhance the dust-proof property or performance is given from time to time to the light source unit case that accommodates the precision devices. For example, in the projector of Patent Document 1, a means is taken in which a tape-like seal member is affixed to an edge portion of a top panel of the light source unit case.

However, in the case where the seal member is affixed after the light source unit case is built up, the number of manhours for fabrication is increased, and the resulting dust-proof performance is affected by the degree of skill of assembling persons. It is considered that an elastic member that is a seal member is attached in advance to an outer circumference of the top panel of the light source unit case. In a top panel made up of corner portions and straight-line portions, a case occurs sometimes in which the dust-proof performance differs depending on outer circumferential portions of the top panel.

SUMMARY OF THE INVENTION

The invention has been made in view of these situations, and an object thereof is to provide a dust-proof case with an improved dust-proof performance, a light source unit including the dust-proof case, and a projector including the light source unit.

According to an aspect of the invention, there is provided a dust-proof case including a case main body having a lid member resting surface that is formed on an outer circumferential portion and a wall portion that is formed on an outer circumferential side of the lid member resting surface, and a lid member having a lid member main body having a plurality of corner portions and an elastic portion that is in abutment with an inner surface of the wall portion that is formed on an outer circumference of the lid member main body and rested on the lid member resting surface, wherein the elastic portion includes the plurality of corner portions and a straight-line portion in a circumferential shape thereof, and wherein a circumferential cross-sectional area of the elastic portion is narrower at the corner portion than at the straight-line portion.

According to another aspect of the invention, there is provided a light source unit including the dust-proof case described above, a light source provided in an interior of the dust-proof case and a light guiding optical system having a plurality of optical members and configured to guide light from the light source unit.

According to a further aspect of the invention, there is provided a projector including the light source unit described above, a display device on to which light source light from the light source unit is shined to form image light, a projection-side optical system configured to project the image light emitted from the display device on to a screen, and a projector control unit configured to control the display device and the light source unit.

BRIEF DESCRIPTION OF THE PREFERRED SEVERAL VIEWS OF THE DRAWINGS

Figure 2:
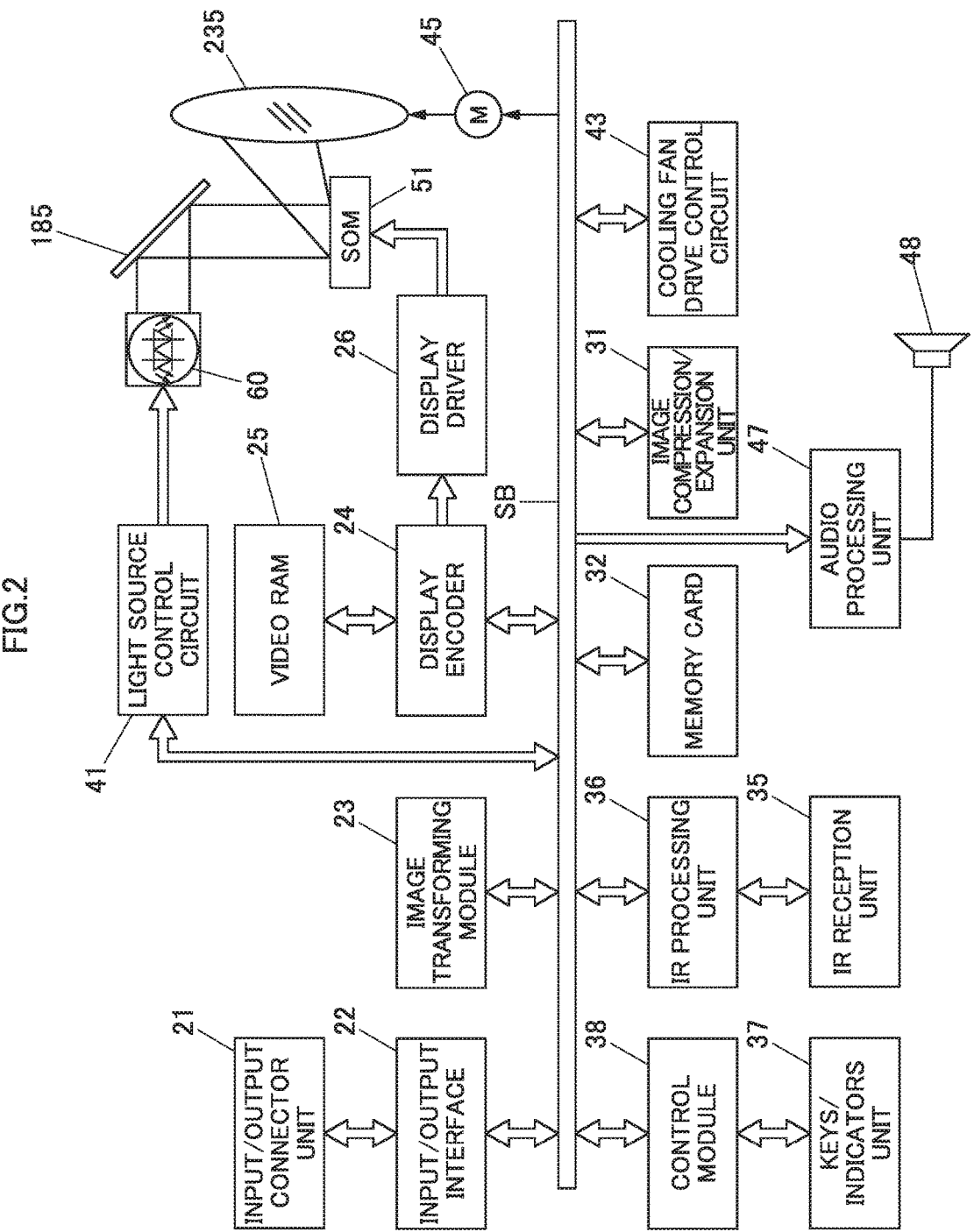
Figure 3:
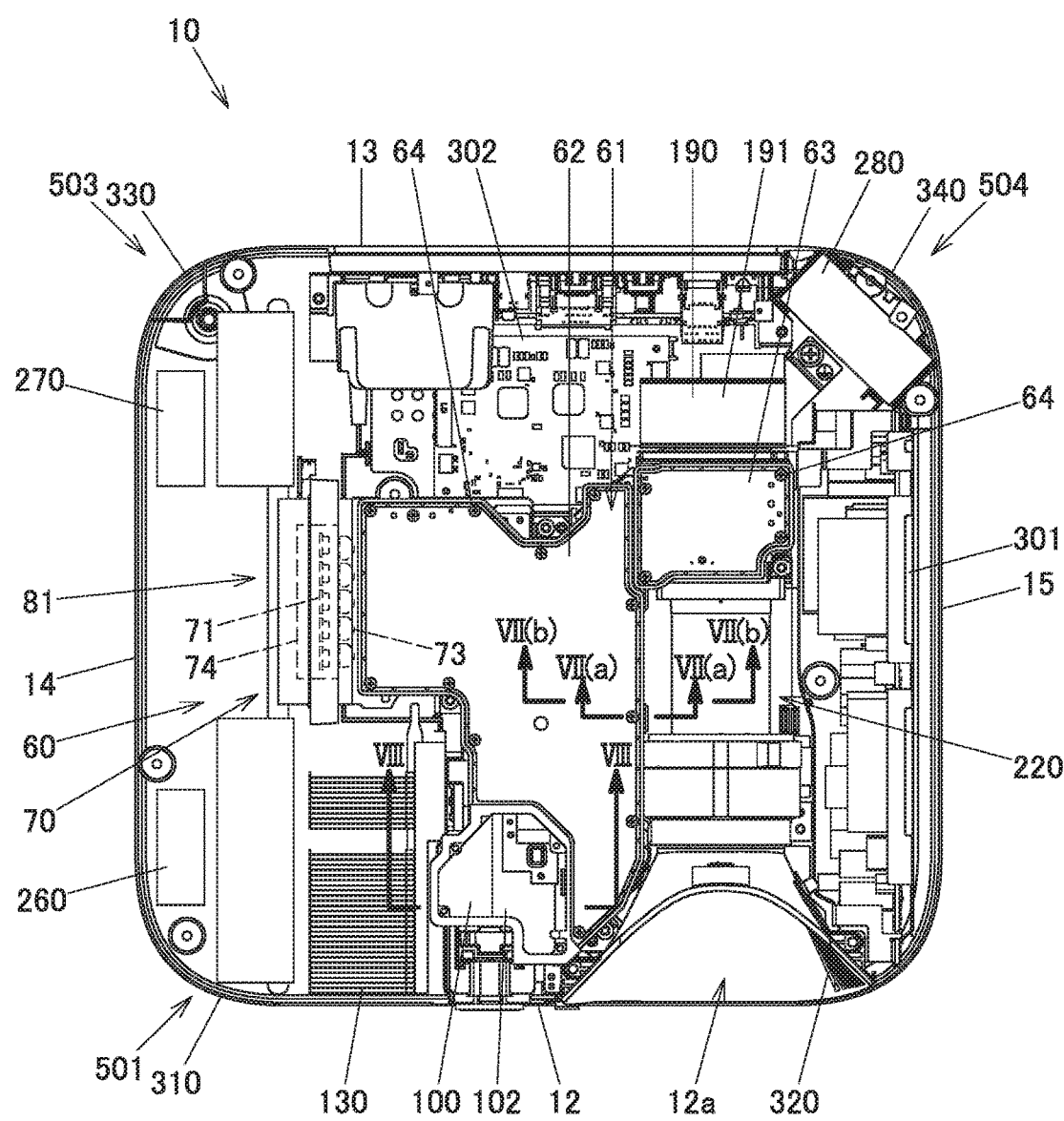
Figure 4:
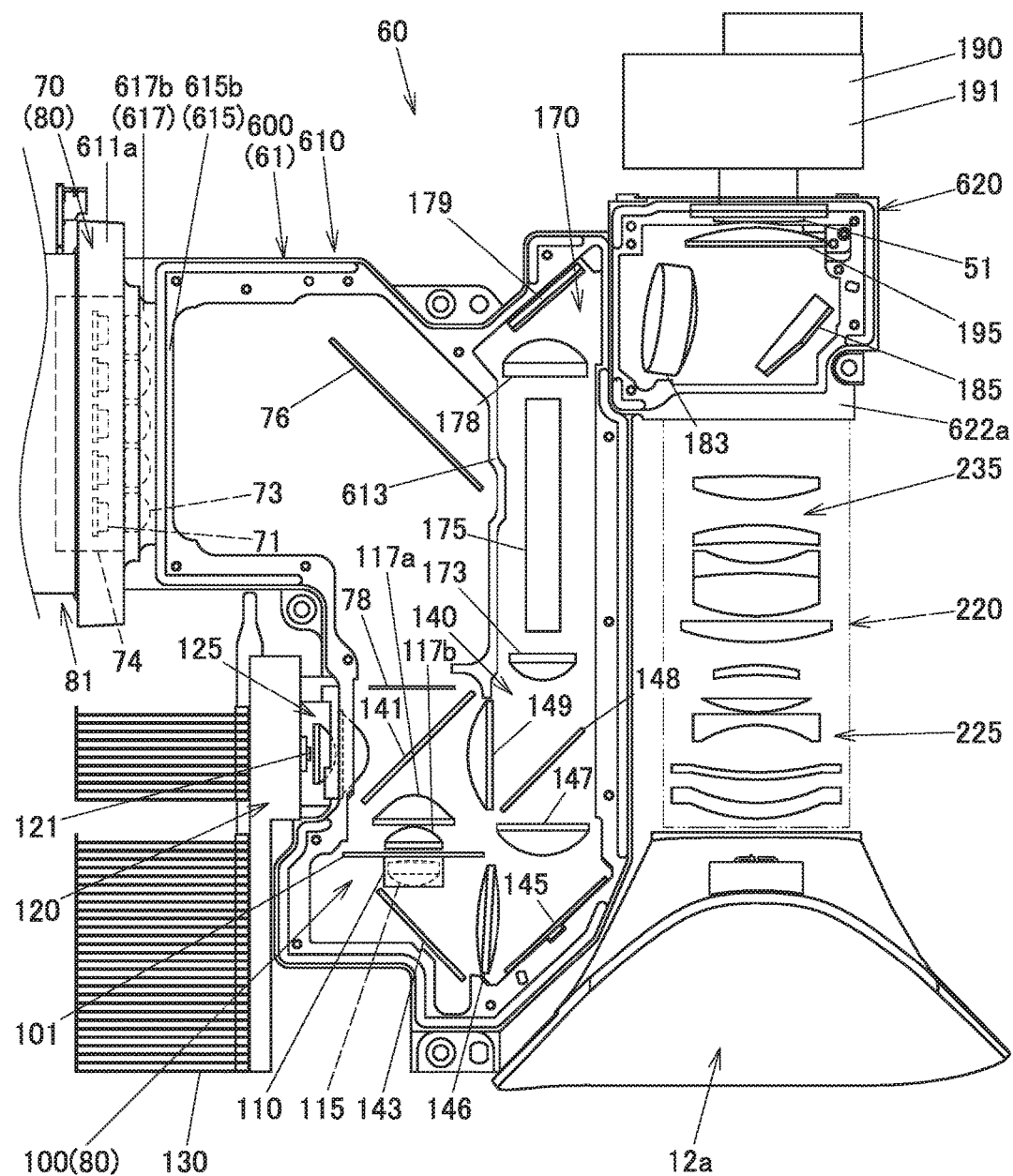
Figure 5:
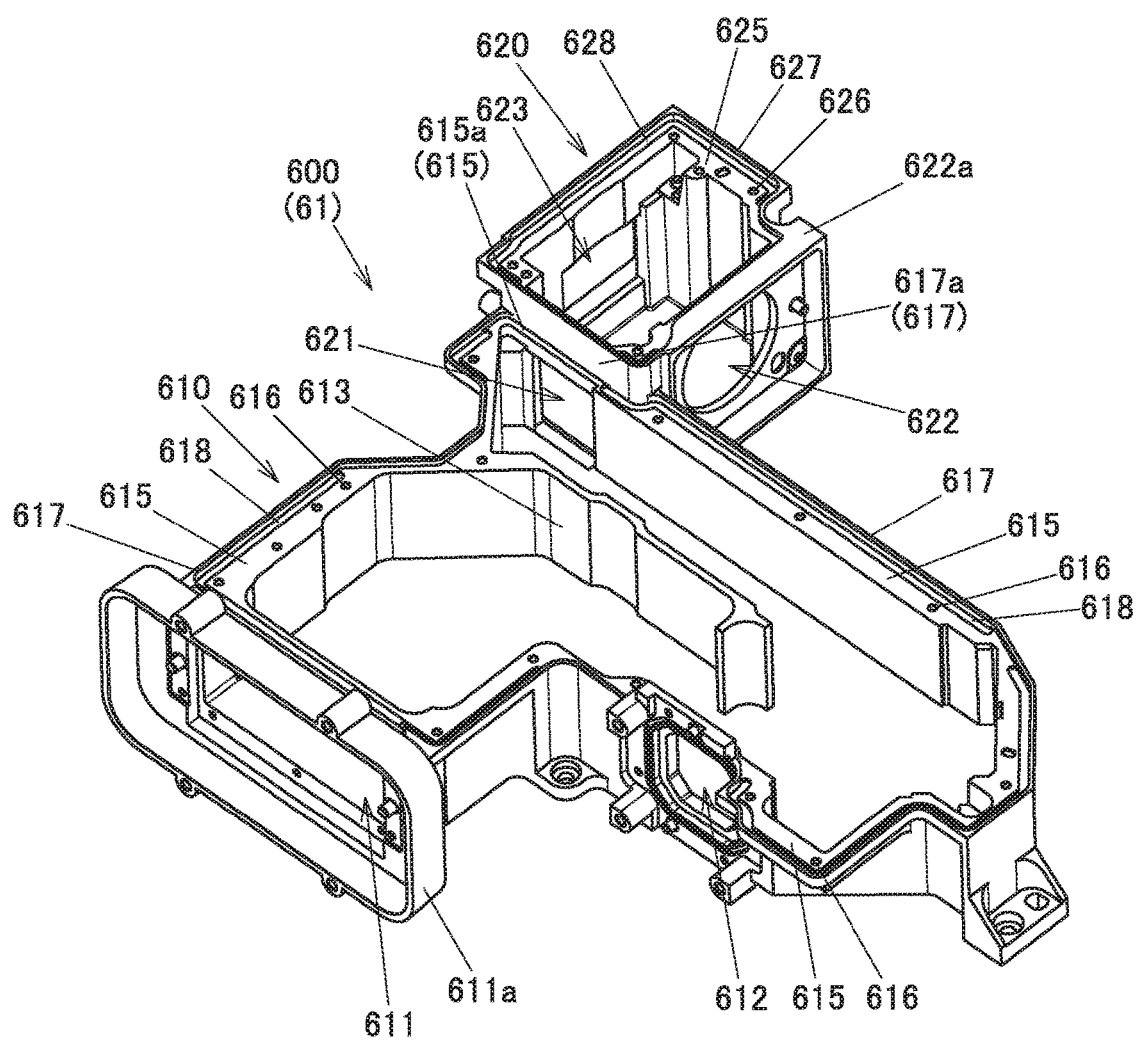
Figure 6:
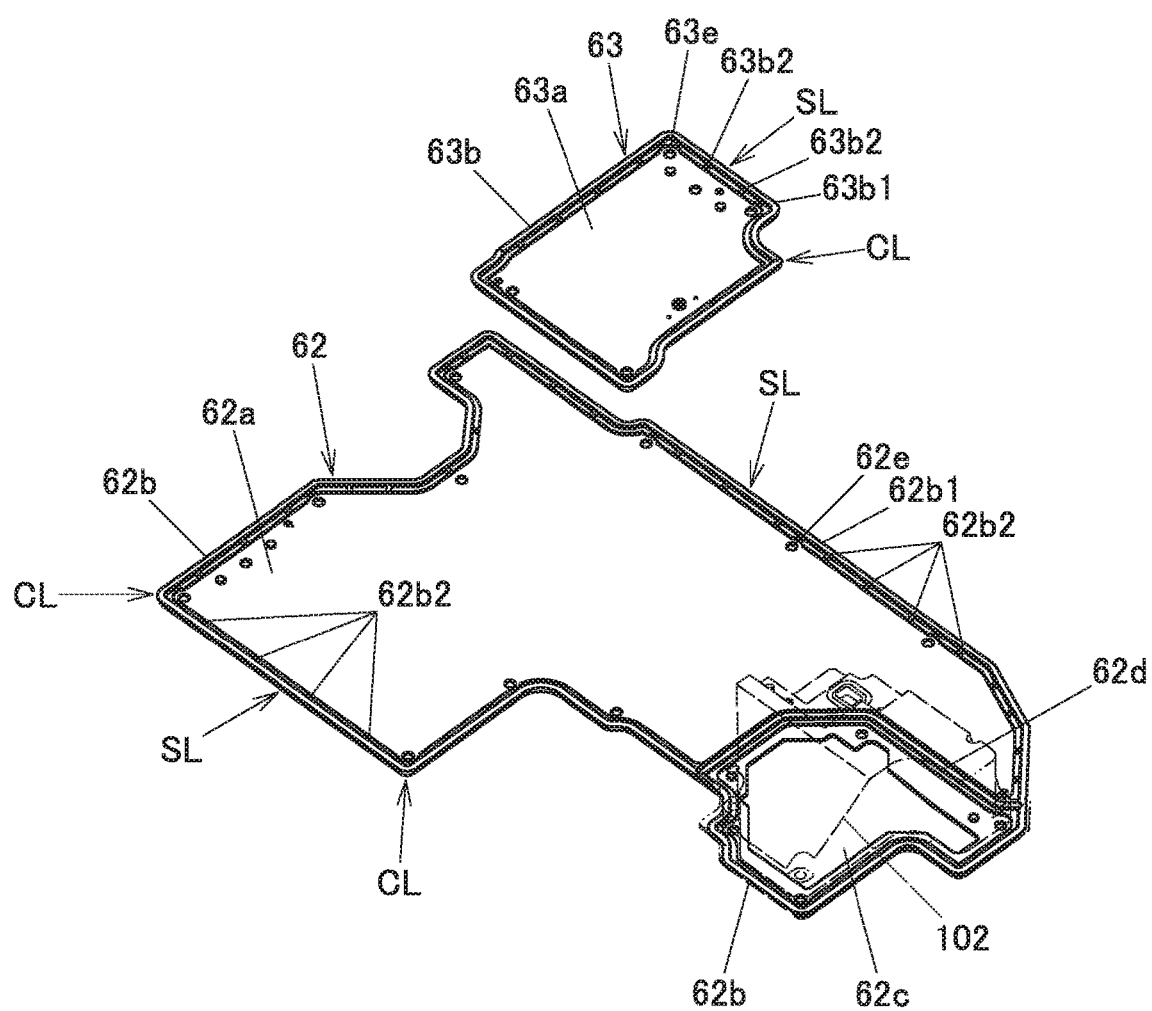
Figure 7A:
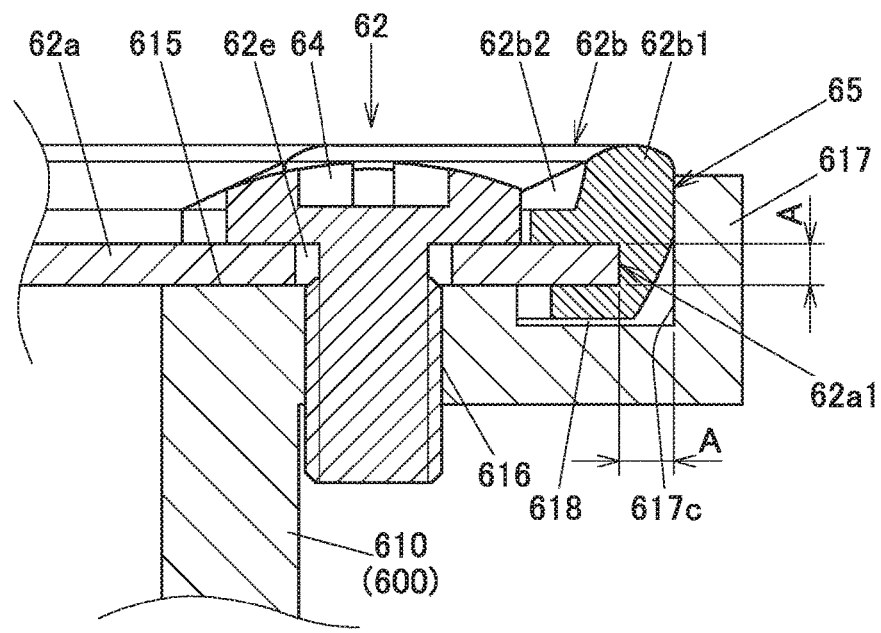
Figure 7B:
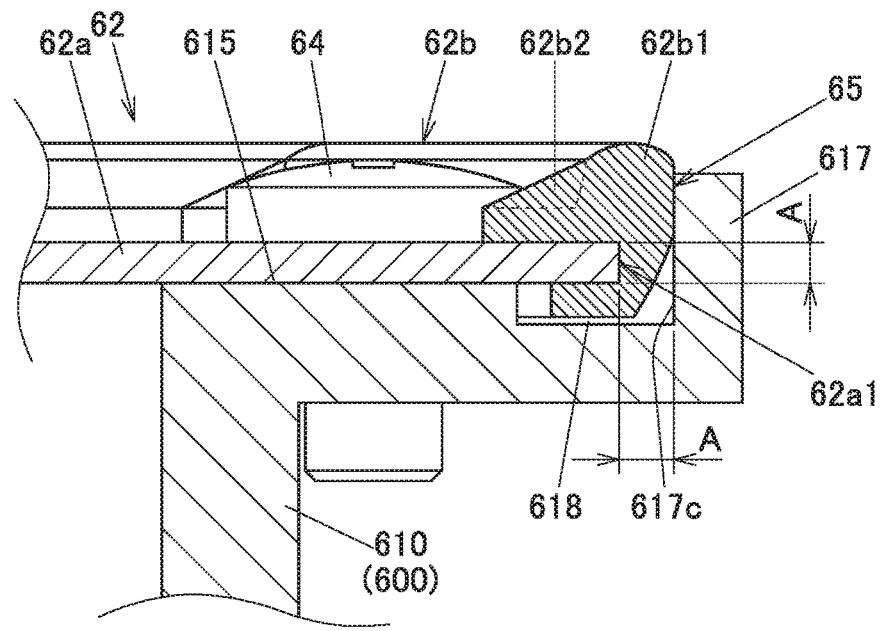
Figure 8:
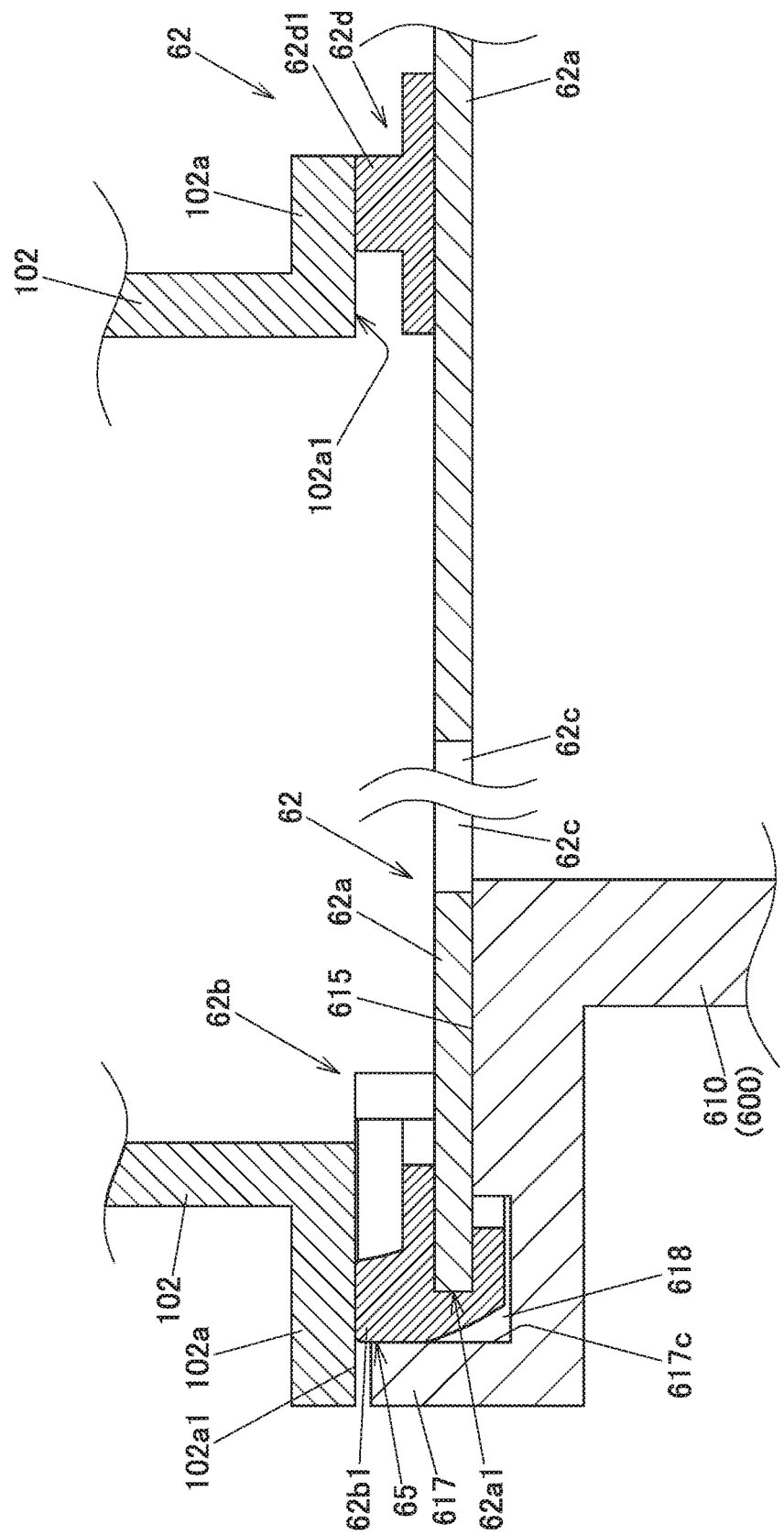

FIG. 1 is an external perspective view of a projector according to an embodiment of the invention, FIG. 2 is a block diagram illustrating functional circuit blocks of the projector according to the embodiment of the invention, FIG. 3 is a schematic plan view illustrating an internal construction of the projector according to the embodiment of the invention, FIG. 4 is a schematic plan view of an interior portion of a light source case of a light source unit according to the embodiment of the invention, FIG. 5 is a perspective view illustrating a case main body of the light source case according to the embodiment of the invention, FIG. 6 is a perspective view illustrating a first lid member and a second lid member of the light source case according to the embodiment of the invention, FIG. 7A is a schematic sectional view of a mounting construction of the case main body and the first lid member of the light source case according to the embodiment of the invention, illustrating a section taken along a line VII(a)-VII(a) shown in FIG. 3, FIG. 7B is a schematic sectional view of the mounting construction of the case main body and the first lid member of the light source case according to the embodiment of the invention, illustrating a section taken along a line VII(b)-VII(b) shown in FIG. 3, and FIG. 8 is a schematic sectional view taken along a line VIII-VIII shown in FIG. 3, illustrating a mounting construction of the case main body and the first lid member of the light source case and a luminescent plate cover according to the embodiment of the invention is used.

DETAILED DESCRIPTION OF THE PREFERRED EMBODIMENTS

Hereinafter, a mode for carrying out the invention will be described. FIG. 1 is an external perspective view of a projector 10. The projector 10 of the embodiment includes a casing upper 10a and a casing lower 10b. A front panel 12, a back panel 13, a right panel 14 and a left panel 15 that constitute side panels of a casing of the projector 10 are erected downwards from an outer circumferential edge of the casing upper 10a. Lower ends of the panels 12 to 15 come into abutment with an outer circumferential edge of the casing lower 10b. Consequently, the projector 10 is formed into a substantially rectangular parallelepiped shape by the casing upper 10a and the casing lower 10b. In description of this embodiment, when left and right are referred to in relation to the projector 10, they denote, respectively, left and right directions with respect to a projecting direction of the projector 10. When front and rear are referred to in relation to the projector 10, they denote, respectively, front and rear directions with respect to the direction of a screen and a traveling direction of a pencil of light from the projector 10.

A keys/indicators unit 37 and a projection image control unit 11a are provided on an upper panel 11 of the casing of the projector 10. Disposed on this keys/indicators unit 37 are keys and indicators including a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control unit or the like when they really overheat. The projection image control unit 11a includes one or a plurality of rotary knobs. Operating this rotary knob controls the position of a movable lens of a projection-side optical system, which will be described later by reference to FIG. 4, to thereby control the size and focus of an image to be projected. Although not shown, the projector 10 includes an Ir reception unit configured to receive a control signal from a remote controller.

Outside air inlet holes 310 are provided in a front-right corner portion 501 defined by the front panel 12 and the right panel 14. A light emitting portion 12a, which is depressed into a mortar-like configuration, is provided to the left of the front panel 12. Outside air inlet holes 320 are formed in an inner wall of the light emitting portion 12a that lies on a side of the left panel 15. The projector 10 has the light emitting portion 12a, a projection port 12b and a lens cover 19 that covers the projection port 12b.

A height control button 12c is provided at a lower end of the front panel 12. The projector 10 has a supporting leg inside the front panel 12. In the projector 10, the supporting leg can be controlled to appear from or disappear into the projector 10 while the height control button 12c is kept pressed down. Thus, the user operates the height control button 12c and fixes an amount of protrusion of the supporting leg to control the height or inclination of the projector 10.

Various types of terminals 20 including a USB terminal, a video signal input D-SUB terminal, an S terminal, an RCA terminal and the like which are provided in input and output connector unit and a power supply adaptor plug and the like are provided on the back panel 13. Additionally, outside air inlet holes 330 are formed in a corner portion 503 defined between the back panel 13 and the right panel 14. Inside air outlet holes 340 are formed in a corner portion 504 defined between the back panel 13 and the left panel 15.

Next, a projector control unit of the projector 10 will be described by the use of a functional circuit block diagram illustrated in FIG. 2. The projector control unit includes a control module 38, an input/output interface 22, an image transforming module 23, a display encoder 24, a display driver 26 and the like.

The control module 38 governs the control of respective operations of circuitries within the projector 10 and is made up of a CPU, a ROM that stores operation programs of various types of settings in a fixed fashion, a RAM that is used as a working memory and the like.

Image signals of various standards that are inputted from the input/output connector unit 21 are sent via the input/output interface 22 and a system bus (SB) to the image transforming module 23 where the image signals are transformed so as to be unified into an image signal of a predetermined format that is suitable for display by the projector control unit. Thereafter, the unified image signal is outputted to the display encoder 24.

The display encoder 24 deploys the inputted image signal on a video RAM 25 for storage therein and generates a video signal from the contents stored in the video RAM 25, outputting the video signal so generated to the display driver 26.

The display driver 26 drives a display device 51, which is a spatial optical modulator (SOM), at an appropriate frame rate in response to the image signal outputted from the display encoder 24.

The projector 10 shines a pencil of light emitted from a light source unit 60 on to the display device 51 by way of a light guiding optical system, which will be described later, whereby an optical image (an image) is formed by using reflected light reflected by the display device 51. The projector 10 projects the image so formed on to a screen for display thereon by way of the projection-side optical system, which will also be described later. A movable lens group 235 of the projection-side optical system is driven by a lens motor 45 for zooming or focusing.

An image compression/expansion unit 31 performs a recording operation in which a luminance signal and a color difference signal of an image signal are data compressed through ADCT and Huffman coding processes, and the compressed data is sequentially written on a memory card 32 that constitutes a detachable recording medium.

With the projector 10 set in a reproducing mode, the image compression/expansion unit 31 reads out the image data recorded on the memory card 32 and expands the individual image data that make up a series of dynamic images frame by frame. Then, the image compression/expansion unit 31 outputs the image data to the display encoder 24 byway of the image transforming module 23 so as to enable the display of dynamic images based on the image data stored on the memory card 32.

Operation signals generated at the keys/indicators unit 37 that includes the main keys and indicators that are provided on the upper panel 11 of the casing are sent out directly to the control module 38. Key operation signals from the remote controller are received by the IR reception unit 35 and are then demodulated into a code signal at an IR processing unit 36 for output to the control module 38.

The control module 38 is connected to an audio processing unit 47 by way of the system bus (SB). This audio processing module 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The control module 38 controls a light source control circuit 41 that is configured as a light source control module. The light source control circuit 41 controls separately the operation of an excitation light shining device of a green light source device and a red light source device of the light source unit 60 so that light of a predetermined wavelength range that is required in forming an image is emitted from the light source unit 60. The light of the predetermined wavelength range emitted from the light source unit 60 is reflected on a shining mirror 185 to be shined on to the display device 51.

The control module 38 causes a cooling fan drive control circuit 43 to detect temperatures through a plurality of temperature sensors which are provided in the light source unit 60 so as to control the revolution speeds of cooling fans based on the results of the temperature detections. Additionally, when receiving an instruction to switch off the power supply to the projector 10, the control module 38 can also cause the cooling fan drive control circuit 43 to keep the cooling fans rotating by use of a timer or the like even after the power supply to a main body of the projector 10 is switched off. Alternatively, the control module 38 can determine on a timing at which the power supply to the main body of the projector 10 is cut off depending upon the results of the temperature detections by the temperature sensors.

Next, an internal construction of the projector 10 will be described based on FIGS. 3 and 4. FIG. 3 is a schematic plan view illustrating an internal construction of the projector 10. The projector 10 includes a power supply unit 301, a control circuit board 302 and the light source unit 60. Additionally, the projector 10 includes an outside air inlet fan 260, an outside air inlet fan 270 and an inside air outlet fan 280 as cooling fans.

The light source unit 60 is disposed substantially at a center of the casing of the projector 10. The light source unit 60 accommodates optical members such as light sources, lenses, mirrors and the like in an interior of a light source case 61. The light source unit 301 is disposed on a side of the light source unit 60 that lies near to the left panel 15. A substrate of the power supply unit 301 is disposed substantially parallel to the left panel 15. The control circuit board 302 is disposed on a side of the light source unit 60 that lies near to the back panel 13. The control circuit board 302 is disposed substantially perpendicular relative to an up-and-down direction. The control circuit board 302 includes a power supply circuit block, a light source control block and the like. Additionally, a plurality of control circuit boards 302 can be provided separately to correspond to different functions of the power supply block, the light source control block and the like.

Here, an internal construction of the light source unit 60 will be described. FIG. 4 is a schematic plan view illustrating the light source unit 60 by omitting a first lid member 62 and a second lid member 63 that make up lid members of the light source case 61 of the light source unit 60. The light source unit 60 includes a red light source device 120 that is a light source of light of a red wavelength band or range, a green light source device 80 that is a light source of light of a green wavelength band or range, and an excitation light shining device 70 that is not only a blue light source device that is a light source of light of a blue wavelength band or range but also an excitation light source. The green light source device 80 is made up of the excitation light shining device 70 and a luminescent plate device 100. The light source unit 60 has a light guiding optical system 140. The light guiding optical system 140 combines a pencil of light of the green wavelength range, a pencil of light of the blue wavelength range and a pencil of light of the red wavelength range together and then guides the pencils of light of the green, blue and red wavelength ranges to the same optical path.

The excitation light shining device 70 is disposed on a side of the casing of the projector 10 that lies near to the right panel 14. The excitation light shining device 70 includes a plurality of solid-state light emitting devices that are disposed so that optical axes thereof are parallel to the back panel 13. The solid-state light emitting devices of this embodiment are a plurality of blue laser diodes 71 that emit light of the blue wavelength range. The plurality of blue laser diodes 71 are disposed parallel to the right panel 14. These blue laser diodes 71 are fixed to a holder (a fixing target member) 74.

In addition, the excitation light shining device 70 includes a reflecting mirror 76, a diffusing plate 78, and a heat sink (a pressing member) 81. The reflecting mirror 76 turns an axis of light emitted from each of the blue laser diodes 71 through about 90 degrees towards the diffusing plate 78. The diffusing plate 78 diffuses light emitted from each of the blue laser diodes 71 and reflected on the reflecting mirror 76 at a predetermined diffusing angle. As shown in FIG. 3, the heat sink 81 is disposed between the blue laser diodes 71 and the right panel 14.

Returning to FIG. 4, collimator lenses 73 are disposed individually on optical paths of lights from the blue laser diodes 71, and the collimator lenses 73 enhance the directivity of lights emitted from the blue laser diodes 71 and transform them into parallel lights. These collimator lenses 73 are held on the holder 74 together with the blue laser diodes 71.

The red light source device 120 includes a red light source 121 that is disposed so that an optical axis thereof becomes parallel to pencils of light of the blue laser diodes 71 and a collective lens group 125 that collects light emitted from the red light source 121. This red light source 121 is a red light emitting diode that is a solid-state light emitting device emitting light of the red wavelength range. The red light source device 120 is disposed so that an axis of light of the red wavelength range emitted from the red light source device intersects an axis of light of the green wavelength range emitted from a luminescent plate 101. The red light source device 120 includes a heat sink 130 on a side of the red light source 121 that lies near to the right panel 14.

The luminescent plate device 100 that makes up the green light source device 80 includes the luminescent plate 101, a motor 110, collective lenses 117a, 117b on an incident side and a collective lens 115 on an emerging side. The luminescent plate 101 is a luminescent wheel that is disposed so as to intersect an axis of light emitted from the excitation light shining device 70 at right angles. This luminescent plate 101 is driven to rotate by the motor 110. The collective lenses 117a, 117b collect pencils of excitation light emitted from the excitation light shining device 70 on to the luminescent plate 101. The collective lens 115 collects pencils of light emitted from the luminescent plate 101 towards the front panel 12. The luminescent plate device 100 is disposed above the collective lenses 117a, 117b, 115. Due to this, part of a lower portion of the luminescent plate 101 is disposed on an optical path of light emitted from the collective lenses 117a, 117b, 115.

A luminous light emitting area and a diffuse transmission area are provided end to end in a circumferential direction on the luminescent plate 101. The luminous light emitting area receives light of the blue wavelength range emitted from the blue laser diodes 71 as excitation light to emit excited luminous light of the green wavelength range. The diffuse transmission area transmits light emitted from the blue laser diodes 71 while diffusing it. The diffuse light transmitted through the diffuse transmission area is emitted as light of the blue wavelength range of the light source unit 60.

The light guiding system 140 has a first dichroic mirror 141, a collective lens 149, a second dichroic mirror 148, a first reflecting mirror 143, a collective lens 146, a second reflecting mirror 145, and a collective lens 147. The first dichroic mirror 141 is disposed in a position where light of the blue wavelength range emitted from the excitation light shining device 70 and light of the green wavelength range emitted from the luminescent plate 101 intersect light of the red wavelength range emitted from the red light source device 120. The first dichroic mirror 141 transmits light of the blue wavelength range and light of the red wavelength range and reflects light of the green wavelength range. An axis of the light of the green wavelength range reflected by the first dichroic mirror 141 is turned through 90 degrees towards the left panel 15 so as to be directed towards the collective lens 149. Thus, an axis of the light of the red wavelength range that is transmitted through the first dichroic mirror 141 coincides with the axis of the light of the green wavelength range that is reflected by the first dichroic mirror 141.

The collective lens 149 is disposed on a side of the first dichroic mirror 141 that lies to be directed to the left panel 15. The light of the red wavelength range that is transmitted through the first dichroic mirror 141 and the light of the green wavelength range that is reflected by the first dichroic mirror 141 are both incident on the collective lens 149. The second dichroic mirror 148 is disposed on a side of the collective lens 149 that lies to be directed to the left panel 15 and a side of the collective lens 147 that lies to be directed to the back panel 13. The second dichroic mirror 148 reflects light of the red wavelength range and light of the green wavelength range and transmits light of the blue wavelength range. Thus, the light of the red wavelength range and the light of the green wavelength range that are collected by the collective lens 149 are reflected by the second dichroic mirror 148 to be turned through 90 degrees towards the back panel 13. A collective lens 173 is disposed on a side of the second dichroic mirror 148 that lies to be directed to the back panel 13. The light of the red wavelength range and the light of the green wavelength range that are reflected by the second dichroic mirror 148 are incident on the collective lens 173.

The first reflecting mirror 143 is disposed on an axis or optical path of the light of the blue wavelength range that is transmitted through the luminescent plate 101, that is, between the collective lens 115 and the front panel 12. The first reflecting mirror 143 reflects light of the blue wavelength range and turns an axis of the light of the blue wavelength range through 90 degrees towards the left panel 15. The collective lens 146 is disposed on a side of the first reflecting mirror 143 that lies to be directed to the left panel 15. The second reflecting mirror 145 is disposed on a side of the collective lens 146 that lies to be directed to the left panel 15. The second reflecting mirror 145 turns an axis of the light of the blue wavelength range that is reflected by the first reflecting mirror 143 and is collected by the collective lens 146 through 90 degrees towards the back panel 13. The collective lens 147 is disposed on a side of the second reflecting mirror 145 that lies to be directed to the back panel 13. The light of the blue wavelength range that is reflected by the second reflecting mirror 145 is transmitted through the second dichroic mirror 148 by way of the collective lens 147 and is then incident on the collective lens 173. The pencils of red, green and blue light that are guided by the light guiding system 140 in the way described above are guided on to the same optical path of a light source-side optical system 170.

The light source-side optical system 170 includes the collective lens 173, a light guiding device 175 such as a light tunnel or a glass rod, a collective lens 178, a light axis turning mirror 179, a collective lens 183, a shining mirror 185, and a condenser lens 195. The condenser lens 195 emits image light that is emitted from the display device 51 that is disposed on a side of the condenser lens 195 that lies to be directed to the back panel 13 towards a projection-side optical system 220, and therefore, the condenser lens 195 constitutes part of the projection-side optical system 220.

Pencils of light emitted from the collective lens 173 are incident on the light guiding device 175. The pencils of light that enter the light guiding device 175 are transformed into pencils of light whose intensities are distributed uniformly by the light guiding device 175.

The light axis turning mirror 179 is disposed on an optical axis of the light guiding device 175 on a side thereof that lies to be directed to the back panel 13 via the collective lens 178. Pencils of light emerging from an emerging port of the light guiding device 175 are collected by the collective lens 178, whereafter axes of the pencils of light are turned to be directed towards the collective lens 183 by the light axis turning mirror 179.

The pencils of light that are reflected by the light axis turning mirror 179 are collected by the collective lens 183 and are then shined on to the display device 51 at a predetermined angle by way of the condenser lens 195 by the shining mirror 185. A heat sink 190 is provided on a side of the display device 51 that lies to be directed to the back panel 13. The display device 51, which is a DMD, is cooled by this heat sink 190. Plate surfaces of fins that are formed on a rear side of the heat sink 190 are formed perpendicular relative to the up-and-down direction.

The pencils of light, which are light source light, shined on an image forming plane of the display device 51 by the light source-side optical system 170 are reflected on the image forming plane of the display device 51 and are then projected on to a screen byway of the projection-side optical system 220 as projected light.

The projection-side optical system 220 is made up of the condenser lens 195, the movable lens group 235 and a fixed lens group 225. The fixed lens group 225 is incorporated in a fixed lens barrel. The movable lens group 235 is incorporated in a movable lens barrel so as to be moved manually or automatically for zooming and focusing.

By configuring the projector 10 in the way described heretofore, when the luminescent plate 101 is rotated and lights are emitted from the excitation light shining device 70 and the red light source device 120 at different timings, lights of the red, green and blue wavelength ranges are incident on the light guiding system 175 by way of the light guiding optical system 140 and are then incident on the display device 51 by way of the light source-side optical system 170. Thus, the display device 51, which is the DMD, of the projector 10 displays the red, green and blue lights in a time sharing fashion according to data, whereby a color image can be projected on to the screen.

Next, the light source case 61, which is configured as a dust-proof case, of the light source unit 60 will be described in detail. As shown in FIG. 5, a case main body 600 of the light source case 61 is formed integrally of aluminum through die casting in this embodiment. The case main body 600 is provided mainly with a bottom surface and side surfaces, and an upper surface of the case main body 600 is opened. The light source case 61 is formed by mounting a lid member (a first lid member 62, a second lid member 63) shown in FIG. 6 on the upper surface of the case main body 600. In the case main body 600 shown in FIG. 5, part of a construction in which the optical members such as the collective lenses and the light guiding device are disposed is omitted.

The case main body 600 has a first case main body 610 that is formed into a substantially L-shape when seen from above and a second case main body 620 that has a cubic shape. An elongated rectangular opening portion 611 is formed in a side surface of the first case main body 610 in a position corresponding to a short side end portion of the substantially L-shaped first case main body 610. A substantially elongated rectangular ring-shaped flange portion 611*a* is formed on an outer circumference of the opening portion 611. The excitation light shining device 70 (refer to FIGS. 3 and 4) is mounted and accommodated in this opening portion 611.

A substantially rectangular opening portion 612 is formed in a side surface of the first case main body 610 in a position corresponding to an inner side surface of a long side of the substantially L-shaped first case main body 610. The red light source device 120 (refer to FIGS. 3 and 4) is mounted and accommodated in this opening portion 612. A partition wall 613 is formed in an interior of the first case main body 610 so as to be substantially parallel to the long side of the substantially L-shaped first case main body 610. Part of the light guiding optical system 140 such as the reflecting mirror 76, the diffusing plate 78, the first dichroic mirror 141 and the like, which are shown in FIG. 4, is disposed in a portion of the first case main body 610 that lies closer to the opening portions 611, 612 than the partition wall 613. Additionally, as shown in FIG. 4, the collective lenses 146, 149 are disposed on substantially the same plane that is substantially parallel to the partition wall 613. Part of the light source-side optical system 170 such as the light guiding device 175 and the like is disposed closer to the second case main body 620 than the partition wall 613.

As shown in FIG. 5, the second case main body 620 is provided so as to connect to a position on the first case main body 610 that corresponds to an outer side of a corner portion of the substantially L-shaped first case main body 610, and an opening portion 621 is formed in the connecting portion. An optical path from the light axis turning mirror 179 to the collective lens 183 shown in FIG. 4 is formed by way of the opening portion 621. The collective lens 183, the shining mirror 185 and the like are disposed in the second case main body 620. A circular opening portion 622 is formed in a side surface of the second case main body 620 that constitutes a front side thereof. A rib 622*a* is formed into a substantially rectangular ring shape on an outer circumference of the opening portion 622.

The movable lens barrel of the projection-side optical system 220 where the movable lens group 235 is accommodated is mounted in the opening portion 622. On the other hand, a rectangular opening portion 623 is formed in a side surface of the second case main body 620 that lies opposite to the opening portion 622. The display device 51 is mounted in this opening portion 623. The mounting portions of the opening portions 611, 612, 622, 623 where the electronic devices such as the blue, red and green light source devices and the display device 51 are mounted are sealed up as required by using a packing such as an O-ring or the like.

Lid member resting surfaces (a first lid member resting surface 615, a second lid member resting surface 625) where lid members (a first lid member 62, a second lid member 63), which will be described later by reference to FIG. 6, are rested are formed on upper portions of outer circumferential portions of the first case main body 610 and the second case main body 620 of the case main body 600. The first lid member resting surface 615 and the second lid member resting surface 625 are each formed into a ring shape, when seen from above, that constitutes a continuous flat surface. Pluralities of screw holes 616, 626 are provided as required on the first lid member resting surface 615 and the second lid member resting surface 625, respectively, at predetermined intervals.

A flat surface of an upper portion of the partition wall 613 of the first case main body 610 is configured as a flat surface that continues to the first lid member resting surface 615. By adopting this configuration, the upper portion of the partition wall 613 can be brought into abutment with a lower surface of the first lid member 62 to thereby support the first lid member 62.

A first wall portion 617 and a second wall portion 627 are formed on outer circumferential sides of the first lid member resting surface 615 and the second lid member resting surface 625, respectively. The first wall portion 617 and the second wall portion 627 constitute wall portions that are erected perpendicularly to the first lid member resting surface 615 and the second lid member resting surface 625, respectively. The first wall portion 617 and the second wall portion 627 are each formed into a ring shape when seen from above and are formed so as to extend along the first lid member resting surface 615 and the second lid member resting surface 625, respectively.

As shown in FIGS. 7A, 7B and 8, the first wall portion 617 and the second wall portion 627 are formed into upright wall shapes that project slightly more upwards than the first lid member resting surface 615 and the second lid member resting surface 625, respectively, and portions of the first wall portion 617 and the second wall portion 627 are formed in common with the other portions. For example, at the connecting portion between the first case main body 610 and the second case main body 620, a first wall portion 617*a* that is used in common with a side surface of the second case main body 620 that lies to face the first case main body 610 is formed as a wall portion corresponding to a first lid member resting surface 615*a*. Additionally, part of a back surface of the flange portion 611*a* of the opening portion 611 where the excitation light shining device 70 is mounted is formed as a step, and a first wall portion 617*b* corresponding to a first lid member resting surface 615*b* is formed (refer to FIG. 4).

In addition, portions where grooves 618, 628 are formed respectively between the first lid resting surface 615 and the first wall portion 617 and between the second lid member resting surface 525 and the second wall portion 627.

Next, the first lid member 62 and the second lid member 63, which are the lid members, will be described based on FIG. 6. Elastic portions 62*b*, 63*b* of silicone rubber, for example, are formed on outer circumferences of lid member main bodies (a first lid member main body 62*a*, a second lid member main body 63*a*) that are each formed of a thin iron plate on the first lid member 62 and the second lid member 63, respectively. In the first lid member 62 and the second lid member 63 of this embodiment, the first lid member main body 62a and the elastic portion 62b and the second lid member main body 63a and the elastic portion 63b are formed as integral parts through insert molding.

The first lid member 62 and the second lid member 63 have external configurations that match open shapes of the first case main body 610 and the second case main body 620 of the case main body 600. Consequently, as shown in FIG. 6, the external configurations of the first lid member 62 and the second lid member 63 (that is, the first lid member main body 62a, the second lid member main body 63a and the elastic portions 62b, 63b) are formed by combining a plurality of straight-line portions SL and a plurality of corner portions CL.

In addition, a hole portion 62c is formed in the first lid member main body 62a of the first lid member 62. This hole portion 62c is an opening portion that is opened for the luminescent plate device 100 of the green light source device 80, and the luminescent plate cover 102 indicated by chain double-dashed lines is mounted therein (refer to FIGS. 3 and 4, too). A connecting elastic portion 62d that connects to the elastic portion 62b at both ends thereof is formed on an outer circumference of the hole portion 62c inside the first lid member main body 62a. The connecting elastic portion 62d is formed of silicone rubber, for example, as with the elastic portion 62b and is formed at the same time as the elastic portion 62b is injection molded.

Additionally, pluralities of bolt holes 62e, 63e are formed as required inwards of the elastic portions 62b, 63b of the first lid member main body 62a and the second lid member main body 63a, respectively. The first lid member 62 and the second lid member 63 are attached respectively to the first case main body 610 and the second case main body 620 of the case main body 600 with bolts 64 (refer to FIG. 3) that are screwed into the screw holes 616, 626 via the bolt holes 62e, 63e.

Next, how the first lid member 62 is attached to the first case main body 610 will be described based on FIGS. 7A, 7B and 8. It should be noted that a state where the second lid member 63 is attached to the second case main body 620 is similar to a state where the first lid member 62 is attached to the first case main body 610 shown in FIGS. 7A, 7B and 8.

As shown in FIG. 7A, the first lid member 62 is rested on the first lid member resting surface 615 so that a lower surface of the first lid member main body 62a is brought into abutment with the first lid member resting surface 615. On the other hand, a protuberant portion 62b1, which protrudes outwards of the first lid member 62 is formed on the elastic portion 62b of the first lid member 62. Then, with the first lid member 62 attached to the first case main body 610, the protuberant portion 62b1 is brought into an inner surface 617c of the first wall portion 617, whereby an abutment portion 65 is formed. As this occurs, the protuberant portion 62b1 at the abutment portion 65 bears a lateral pressure from the inner surface 617c of the first wall portion 617 to be collapsed. Then, the abutment portion 65 is formed more upwards in FIGS. 7A, 7B (in other words, nearer to an end portion side or an open side of the first wall portion 617) than an outer circumferential end face portion 62a1 of the first lid member 62.

Here, since the first lid member main body 62a is formed of the metallic plate member, it is difficult to form the first lid member main body 62a so as to have a highly accurate external configuration. Consequently, in the case where the abutment portion 65 is formed between the outer circumferential end face portion 62a1 and a portion of the inner surface 617c of the first wall portion 617 that faces the outer circumferential end face portion 62a1 (an area indicated by A-A in FIGS. 7A, 7B), due to the fact that a distance between the outer circumferential end face portion 62a1 and the inner surface 617c of the first wall portion 617 differs depending on locations, a collapsing amount of the elastic portion 62b changes depending on locations, leading to a risk of an airtightness provided by the abutment portion 65 being affected from time to time. However, in this embodiment, since the abutment portion 65 is formed in a position that deviates from the outer circumferential end face portion 62a1, the abutment portion 65 is never affected by the accuracy of the external configuration of the first lid member main body 62a, whereby the collapsing amount of the elastic portion 62b at the abutment portion 65 can be made uniform around a full circumference of the elastic portion 62b. Further, since the abutment portion 65 is formed at the end portion side or open side of the first wall portion 617, the elastic portion 62b is not restricted from being deformed in any way when it is collapsed at the abutment portion 65.

In addition, as shown in FIG. 6, pluralities of ribs 62b2, 63b2 are formed on the straight-line portions SL of the elastic portions 62b, 63b of the first lid member 62 and the second lid member 63, respectively, at predetermined intervals in a longitudinal direction of the straight-line portions SL. To describe this in greater detail, as shown in FIGS. 7A, 7B, the ribs 62b2 are formed on an inner side of the elastic portion 62b so as to connect together the protuberant portion 62b1 and a base portion where the elastic portion 62b connects to the first lid member main body 62a. Consequently, in the elastic portion 62b, a cross-sectional area of a portion where the rib 62b2 is formed greater than a cross-sectional area of a portion where the rib 62b2 is not formed. In this way, the elastic portions 62b, 63b are formed so that their cross-sectional areas change in the circumferential direction in such a way that the cross-sectional area of the straight-line portion SL becomes greater than a cross-sectional area of the corner portion CL. In this embodiment, the elastic portions 62b, 63b are formed so as to include the corner portions CL and the straight-line portions SL. Elastic materials of the elastic portions 62b, 63b become denser at the corner portions CL than at the straight-line portions SL, and hence, the elastic portions 62b, 63b are deformed less at the corner portions CL than at the straight-line portions SL. Then, it is concerned that an adhesion force of the abutment portion 65 at the straight-line portions SL becomes lower than an adhesion force of the abutment portion 65 at the corner portions CL. In this embodiment, however, the pluralities of ribs 62b2, 63b2 are formed on the elastic portions 62b, 63b, so that the cross-sectional areas of the portions of the elastic portions 62b, 63b where the ribs 62b2, 63b2 are formed become greater than the cross-sectional areas of the corner portions CL of the elastic portions 62b, 63b. This enables the protuberant portions 62b1, 63b1 at the straight-line portions SL to be supported from a side that faces the abutment portion 65 by the pluralities of ribs 62b2, 63b2, whereby the adhesion force of the abutment portion 65 at the straight-line portions SL can be made equal to the adhesion force of the abutment portion 65 at the corner portions CL.

In the embodiment, the cross-sectional areas of the elastic portions 62b, 63b are changed in the circumferential direction by forming the pluralities of ribs 62b2, 63b2. However, the invention is not limited thereto. For example, the elastic portions 62b, 63b can also be formed so that the cross-sectional areas thereof change gradually in the circumferential direction. In addition, in this embodiment, as shown in FIGS. 7A, 7B, the elastic portion 62b is formed so as to be secured to the upper surface, the lower surface and the outer circumferential end face portion 62a1 of the first lid member main body 62a. However, the invention is not limited thereto. A configuration may be adopted in which a portion of the elastic portion 62b that corresponds to the lower surface of the first lid member main body 62a is omitted, so that the elastic portion 62b is secured to the upper surface and the outer circumferential end face portion 62a1 of the first lid member main body 62a.

Additionally, as shown in FIG. 8, a flange-like opening edge 102a is formed at an edge of a lower opening portion of the luminescent plate cover 102 that is provided in the hole portion 62c of the first lid member 62. A lower end face 102a1 of the opening edge 102a is brought into abutment with the elastic portion 62b and the connecting elastic portion 62d that face the lower end face 102a1. Here, the connecting elastic portion 62d is formed so as to have a projecting cross section. Namely, to describe this in detail, the lower end face 102a1 of the opening edge 102a of the luminescent plate cover 102 is brought into abutment with a projecting end portion 62d1 of the connecting elastic portion 62d. The projecting end portion 62d1 of the connecting elastic portion 62d is collapsed by the lower end face 102a1 of the opening edge 102a to thereby be caused to adhere to the lower end face 102a1.

On the other hand, in the elastic portion 62b that faces the lower end face 102a1 of the opening edge 102a, an upper portion of the protuberant portion 62b1 of the elastic portion 62b is brought into abutment with the lower end face 102a1 of the opening edge 102a. The upper portion of the protuberant portion 62b1 is collapsed by the lower end face 102a1 of the opening edge 102a to thereby caused to adhere to the lower end face 102a1.

Thus, according to the embodiment of the invention that has been described heretofore, the light source case 61, which is configured as the dust-proof case, includes the case main body 600 (the first case main body 610, the second case body 620) having the lid member resting surface (the first lid member resting surface 615, the second lid member resting surface 625) that is formed on the outer circumferential portion and the wall portion (the first wall portion 617, the second wall portion 627) that is formed on the outer circumferential side of the lid member resting surface and the lid member (the first lid member 62, the second lid member 63) in which the cross sections of the elastic portions 62b, 63b change in the circumferential direction. Namely, the lid member (the first lid member 62, the second lid member 63) that is rested on the lid member resting surface (the first lid member resting surface 615, the second lid member resting surface 625) has the lid member main body (the first lid member main body 62a, the second lid member main body 63a) having the plurality of corner portions (the portions corresponding the corner portions CL) and the elastic portions 62b, 63b that are in abutment with the inner surface of the wall portion (the first wall portion 617, the second wall portion 627) that is formed on the outer circumference of the lid member main body (the first lid member main body 62a, the second lid member main body 63a). Then, the elastic portions 62b, 63b includes the plurality of corner portions (the portions corresponding to the corner portions CL) and the straight-line portions (the portions corresponding to the straight-line portions SL) in the circumferential configuration, and the cross sections of the elastic portions 62b, 63b are smaller at the corner portions than at the straight-line portions.

By adopting this configuration, the adhesion force of the abutment portion 65 where the elastic portions 62b, 63b are brought into abutment with the inner surfaces of the first wall portion 617 and the second wall portion 627, respectively, can be made substantially uniform at any portions of the elastic portions 62b, 63b. Consequently, it is possible to provide the dust-proof case with the enhanced dust-proof performance that is the light source case 61 that accommodates therein the electronic devices such as the red, blue and green light source devices and the precision devices such as optical members like the collective lenses.

Then, the optical members such as the collective lenses are pressed from above by the first lid member 62 and the second lid member 63 and are fixedly held by the bottom surface of the light source case 61 and the first lid member 62b and the second lid member 63. As this occurs, since an elastic member such as an O-ring configured to prevent the intrusion of dust is not disposed between the first lid member resting surface 615 and the second lid member resting surface 625 and the first lid member 62 and the second lid member 63, respectively, the optical members can be fixed in place accurately by the first lid member 62 and the second lid member 63.

Additionally, the abutment portion 65 is positioned more upwards than the outer circumferential end face portion (62a1) of the first lid member main body 62a and the second lid member main body 63a. Since the adhesion force of the abutment portion 65 can be made uniform irrespective of the accuracy of the external configurations of the first lid member main body 62a and the second lid member main body 63a by adopting the configuration described above, it is possible to provide the dust-proof case that is the light source case 61 with the enhanced dust-proof performance.

The elastic portions 62b, 63b include the corner portions CL and the straight-line portions SL and are formed so that the circumferential cross sections thereof are greater at the straight-line portions SL than at the corner portions CL. Namely, the pluralities of ribs or thick portions are formed on the straight-line portions of the elastic portions at the predetermined intervals in the longitudinal direction of the straight-line portions SL. Since the adhesion force of the straight-line portions SL where the adhesion force tends to be weak can be made strong by adopting the configuration described above, even though the light source case 61 has the complex configuration, it is possible to allow the light source case 61 to exhibit the stable dust-proof performance. Additionally, the adhesion force at the abutment portion 65 can easily be designed by changing the cross-sectional areas of the elastic portions 62b, 63b by the ribs 62b2, 63b2.

The protuberant portion (62b1) that protrudes outwards is formed on the elastic portions 62b, 63b, and this protuberant portion (62b1) is brought into abutment with the inner surfaces (617a) of the first wall portion 671 and the second wall portion 627, whereby the abutment portion 65 that exhibits the uniform adhesion force can easily be formed.

The first lid member 62 includes the hole portion 62c, and the connecting elastic portion 62d is formed at the outer circumferential portion of the hole portion 62c. This connecting elastic portion 62d connects to the elastic portion 62b and has the projecting cross section. By adopting this configuration, even though the luminescent plate device 100, which is the device projecting from the light source case 61, is provided in the light source case 61, the dust-proof performance between the luminescent plate cover 102 and the first lid member 62 can be enhanced, thereby making it possible to reduce a risk of dust entering the light source case 61 from the hole portion 62c.

The light source unit 60 includes as its constituent elements that are accommodated in the light source case 61 the light source devices (the red light source device 120, the green light source device 80, the blue light source device (the excitation light shining device 70)) and the light guiding optical system 140 having the plurality of optical members and configured to guide light from the red, green and blue light source devices. By adopting this configuration, it is possible to provide the light source unit 60 including the light source case 61 that is the dust-proof case with the enhanced dust-proof performance.

Then, the projector 10 has the light source unit 60 including the light source case 61, the display device 51 on to which light source light from the light source unit 60 is shined to form image light, the projection-side optical system 220 configured to project the image light from the display device 51 on to the screen, and the projector control unit configured to control the display device 51 and the light source unit 60. By adopting this configuration, it is possible to provide the projector with the enhanced dust-proof performance.

While the embodiments of the invention have been described heretofore, these embodiments are presented as examples, and hence, there is no intention to limit the scope of the invention by the embodiments. These novel embodiments can be carried out in other various forms, and various omissions, replacements and modifications can be made thereto without departing from the spirit and scope of the invention. Those resulting embodiments and their modifications are included in the spirit and scope of the invention and are also included in the scope of inventions claimed for patent under claims below and their equivalents.

What is claimed is:

1. A dust-proof case comprising:
a case main body having a lid member resting surface that is formed on an outer circumferential portion and a wall portion that is formed on an outer circumferential side of the lid member resting surface; and
a lid member having a lid member main body having a plurality of corner portions and an elastic portion that is in abutment with an inner surface of the wall portion that is formed on an outer circumference of the lid member main body and rested on the lid member resting surface,
wherein the elastic portion includes the plurality of corner portions and a straight-line portion in a circumferential shape thereof, and
wherein a circumferential cross-sectional area of the elastic portion is narrower at the corner portion than at the straight-line portion.

2. The dust-proof case according to claim 1,
wherein an abutment portion where the inner surface of the wall portion is brought into abutment with the elastic portion is positioned more upwards than an outer circumferential end face portion of the lid member main body.

3. The dust-proof case according to claim 1,
wherein a plurality of ribs or thick portions are formed on the straight-line portion of the elastic portion at predetermined intervals in a longitudinal direction of the straight-line portion.

4. The dust-proof case according to claim 2,
wherein a plurality of ribs or thick portions are formed on the straight-line portion of the elastic portion at predetermined intervals in a longitudinal direction of the straight-line portion.

5. The dust-proof case according to claim 1,
wherein the elastic portion has formed thereon a protuberant portion that protrudes outwards, and the protuberant portion is brought into abutment with the inner surface of the wall portion.

6. The dust-proof case according to claim 2,
wherein the elastic portion has formed thereon a protuberant portion that protrudes outwards, and the protuberant portion is brought into abutment with the inner surface of the wall portion.

7. The dust-proof case according to claim 3,
wherein the elastic portion has formed thereon a protuberant portion that protrudes outwards, and the protuberant portion is brought into abutment with the inner surface of the wall portion.

8. The dust-proof case according to claim 4,
wherein the elastic portion has formed thereon a protuberant portion that protrudes outwards, and the protuberant portion is brought into abutment with the inner surface of the wall portion.

9. The dust-proof case according to claim 1,
wherein a hole portion is formed in the lid member, and
wherein a connecting elastic portion connecting to the elastic portion and having a projecting cross section is formed on an outer circumferential portion of the hole portion.

10. The dust-proof case according to claim 2,
wherein a hole portion is formed in the lid member, and
wherein a connecting elastic portion connecting to the elastic portion and having a projecting cross section is formed on an outer circumferential portion of the hole portion.

11. The dust-proof case according to claim 3,
wherein a hole portion is formed in the lid member, and
wherein a connecting elastic portion connecting to the elastic portion and having a projecting cross section is formed on an outer circumferential portion of the hole portion.

12. The dust-proof case according to claim 4,
wherein a hole portion is formed in the lid member, and
wherein a connecting elastic portion connecting to the elastic portion and having a projecting cross section is formed on an outer circumferential portion of the hole portion.

13. The dust-proof case according to claim 5,
wherein a hole portion is formed in the lid member, and
wherein a connecting elastic portion connecting to the elastic portion and having a projecting cross section is formed on an outer circumferential portion of the hole portion.

14. The dust-proof case according to claim 6,
wherein a hole portion is formed in the lid member, and
wherein a connecting elastic portion connecting to the elastic portion and having a projecting cross section is formed on an outer circumferential portion of the hole portion.

15. A light source unit comprising:
the dust-proof case according to claim 1;
a light source provided in an interior of the dust-proof case; and
a light guiding optical system having a plurality of optical members and configured to guide light from the light source unit.

16. A light source unit comprising:
the dust-proof case according to claim 2;
a light source provided in an interior of the dust-proof case; and a light guiding optical system having a plurality of optical members and configured to guide light from the light source unit.

17. A light source unit comprising:
the dust-proof case according to claim 3;
a light source provided in an interior of the dust-proof case; and
a light guiding optical system having a plurality of optical members and configured to guide light from the light source unit.

18. A light source unit comprising:
the dust-proof case according to claim 4;
a light source provided in an interior of the dust-proof case; and
a light guiding optical system having a plurality of optical members and configured to guide light from the light source unit.

19. A light source unit comprising:
the dust-proof case according to claim 5;
a light source provided in an interior of the dust-proof case; and
a light guiding optical system having a plurality of optical members and configured to guide light from the light source unit.

20. A projector comprising:
the light source unit according to claim 15;
a display device on to which light source light from the light source unit is shined to form image light;
a projection-side optical system configured to project the image light emitted from the display device on to a screen; and
a projector control unit configured to control the display device and the light source unit.

* * * * *